B. MORAHAN.
Broom.
No. 66,611.
Patented July 9, 1867.
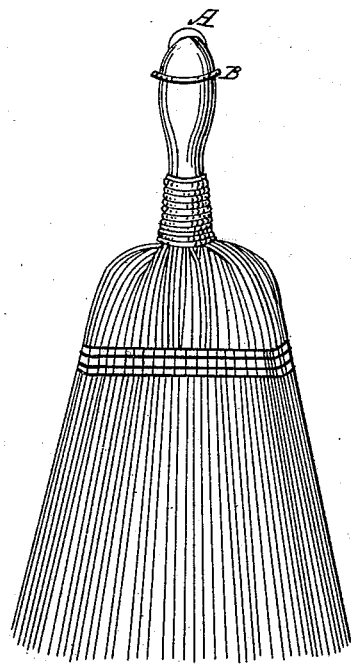
WITNESSES:
James Sangster
O. W. Seely
INVENTOR:
Bernard Morahan

United States Patent Office.

BERNARD MORAHAN, OF BROOKLYN, NEW YORK.

Letters Patent No. 66,611, dated July 9, 1867.

IMPROVED CLOTHES-BROOM OR WHISK.

The Schedule referred to in these Letters Patent and making part of the same.

TO ALL WHOM IT MAY CONCERN:

Be it known that I, BERNARD MORAHAN, of Brooklyn, in the county of Kings, and in the State of New York, have invented a new and useful improvement in Clothes-Brushes or Brooms; and do hereby declare that the following is a full, clear, and exact description thereof, reference being had to the accompanying drawings and to the letters of reference marked thereon.

The nature of my invention consists in the combination of a scraper or rubber with a clothes-brush or broom, said scraper being made of metal, wood, rubber, or any other equivalent substance.

To enable others skilled in the art to make and use my invention, I will proceed to describe its construction and operation.

I construct my broom or brush in any of the usual forms. A, in the accompanying drawings, represents my improvement as attached to a brush-broom; it consists of a steel or brass scraper or rubber, of the proper form, for scraping or rubbing the dirt from clothes, such as spots of paint, mud, &c. I do not confine myself to any particular form of scraper, or of the material for making the same; it may be made of wood, and be simply a continuation of the handle made into the required form, or it may be made of rubber, leather, or other equivalent substance, without changing the nature of the invention. B, in said drawings, represents another form in which the scraper may be made, and which is equivalent to the one shown at A; it consists of a sharp projecting rib or ring surrounding the handle, as shown. The blade or scraper A, if made of metal, is so formed that it may be driven into the handle; if of wood, it is formed of one piece with the handle; if rubber, or other flexible substance, an opening is made in the handle, into which it is fitted.

What I claim as my invention, and desire to secure by Letters Patent, is—

The combination of the scraper or rubber A, or the equivalent thereof, with a clothes-brush or broom, substantially as and for the purposes described.

BERNARD MORAHAN.

Witnesses:
JAMES SANGSTER
O. W. SEELY.